United States Patent [19]

Shteynberg

[11] Patent Number: 5,277,309
[45] Date of Patent: Jan. 11, 1994

[54] DISKETTE HOLDER WITH ROLL DOOR

[76] Inventor: Boris Shteynberg, 6438 Geary Blvd. Apt. #207, San Francisco, Calif. 94121

[21] Appl. No.: 18,172

[22] Filed: Feb. 16, 1993

[51] Int. Cl.$^5$ .............................................. B65D 5/50
[52] U.S. Cl. ............................ 206/45.150; 206/45.18; 206/425; 206/444; 312/9.58
[58] Field of Search ............... 206/45.15, 45.17, 45.18, 206/425, 444; 312/9.41, 9.43, 9.45, 9.58, 9.59, 139.2

[56] References Cited

U.S. PATENT DOCUMENTS

| | | | |
|---|---|---|---|
| 1,565,993 | 12/1925 | Fitzpatrick | 312/9.58 |
| 3,930,577 | 1/1976 | Kortick | 206/45.13 |
| 4,221,440 | 9/1980 | Morgan | 312/9.45 |
| 4,479,577 | 10/1984 | Eichner et al. | 206/425 |
| 4,523,680 | 6/1985 | Saito et al. | 312/9.58 |
| 4,527,692 | 7/1985 | Neuman | 206/45.18 |
| 4,580,679 | 4/1986 | Hellman, III | 206/425 |
| 4,655,342 | 4/1987 | Brauner | 206/45.18 |
| 4,766,999 | 8/1988 | Kin-Shon | 206/45.18 |

Primary Examiner—David T. Fidei
Attorney, Agent, or Firm—Boris Shteynberg

[57] ABSTRACT

A diskette holder comprises a housing (50), a tambour (52), and a holding case (54). Dovetail couplings (68 and 70) are located on side panels (58 and 60) of the housing and keyhole openings (76a and 76b) are situated on the housing's rear panel (63). A bottom portion (84) of the holding case comprises stepped strips (92a and 92b). The side panels of the housing have two opposed curved grooves (64) and two opposed fulcrum pins (66) on their inside faces. One of the side panels also contains stops (72 and 74) at its interior. Sides (78 and 80) of the holding case contain a plurality of opposed vertical dividing ribs (90) on their inner faces. The holding case sides also possess opposed pivot openings (91). A front panel (82) of the holding case includes a closure lip (94) protruding outwardly along the top edge of the panel. An opening tab (96) is situated along the top of a rear panel (86) of the holding case. The tambour, which is slidingly positioned within the curved grooves, has an opening end (98) and a closing end (100). An inwardly-protruding stop (102) is located below the edge of the closing end of the tambour, while a handle (104) is situated below the edge of the closing end on the exterior portion of the tambour. The diskette holder has a novel opening-and-closing mechanism which allows the holder to operate in a plurality of orientations and to be opened and closed with only one hand. Moreover, the holder may be mounted on a vertical surface, does not occupy much desk space, and may by joined side-to-side with a plurality of identical containers.

11 Claims, 5 Drawing Sheets

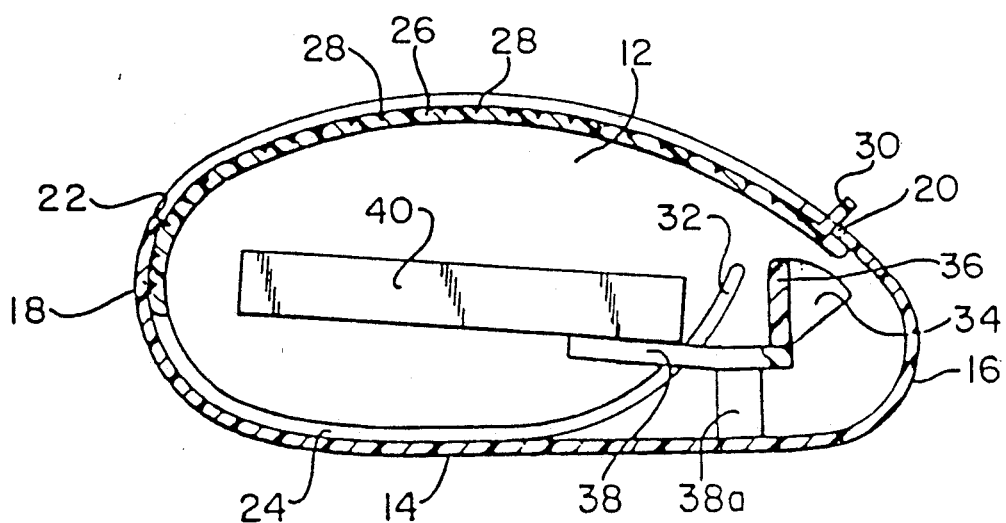
_Fig.1_ PRIOR ART

DISKETTE HOLDER WITH ROLL DOOR

BACKGROUND—FIELD OF INVENTION

The present invention relates to storage containers, particularly to an improved diskette holder for protecting magnetic diskettes from damage and contamination.

BACKGROUND —DESCRIPTION OF PRIOR ART

Currently, diskette storage containers of many different kinds are known and used.

One commonly utilized type has a case with a hinged, flip-top lid. However, these containers tend to open or fall apart when dropped, thus exposing their contents to damage.

Another type of container, disclosed in U.S. Pat. No. 4,580,679 to Hellman, 1986, has a roll-door construction. When dropped, such containers protect magnetic diskettes from injury since the roll door, situated in the track slots of the two sidepanels, cannot be opened by an impact.

However, Hellman's container has several notable shortcomings. Specifically, it cannot be mounted on a vertical surface, such as a wall, to increase desk space. The space-saving characteristics of the container are further compromised since it will not operate properly when positioned onto its front or rear face, which occupy less space then the bottom panel of the container. If the container is positioned onto its front or rear face, the diskettes fall out when the roll door is opened. Moreover, the container is constructed such that one must use both hands to open and close the container, i.e., one hand to hold the case and the other to slide the roll door open or closed. Furthermore, a diskette partially protruding outside the container may jam between the roll door and the case, preventing the roll door from being closed. Also, several such containers can't be joined side-to-side to form an array which can be displayed or transported as a unit.

Another container having a roll door is described in U.S. Pat. No. 3,930,577 to Kortick, 1976. Kortick's container, which is of particular interest, will be shown and described in detail below. As shown in FIG. 1, this display container comprises a molded plastic housing formed with oval sides 12 connected by an integral wall 14. The container opening extends from a front edge 20 to a rear edge 22 of wall 14. Sides 12 have opposed grooves 24. A cover 26 comprises a rectangular flexible strip having spaced grooves 28 extending transversely to provide a thin flexible web portion between thicker portions, which allows the cover to swing around a curved end 18. Cover 26 is slidably mounted in grooves 24 and has an integral vertical front end 30 for manually sliding the cover.

Sides 12 have sector-shaped recesses 34. A flat elongated rectangular bar 36 is loosely mounted in recesses 34 so that it can pivot from a vertical to a slanted position against the front walls of recess 34. A short supporting plate 38 extends horizontally from the bottom edge of bar 36 towards curved end 18. A rectangular supporting frame 40 is mounted on plate 38 and extends longitudinally into the container. In closed position, the bottom of support plate 38 has a vertical block 38a which rests on the bottom of the plastic housing to hold plate 38 and frame 40 horizontally.

The above-described display container also possesses several salient flaws. The container functions properly in only one orientation, since its housing contains no active closing mechanism and its frame 40 passively returns to the horizontal position only when acted upon by gravity. Thus, the container cannot be used for space-saving purposes since it cannot be placed on its side or mounted on a vertical surface. Moreover, as in the previously discussed storage devices, two hands must be utilized to open and close the container. Furthermore, the container has no provisions for side-to-side coupling.

OBJECTS AND ADVANTAGES

It is accordingly an object of the invention to provide a diskette holder which overcomes the foregoing disadvantages, i.e., which operates in a plurality of orientations, which may be opened and closed with one hand, which may be mounted on a vertical surface and which occupies little desk space, which may be joined side-to-side with a plurality of identical containers, and which is simple and inexpensive to manufacture. Further objects and advantages will become apparent after consideration of the ensuing description and the accompanying drawings.

DRAWING FIGURES

FIG. 1 is a cross-sectional view of a prior-art storage container.

REFERENCE NUMERALS USED INT HE DRAWINGS AND DESCRIPTION

Figure 2:
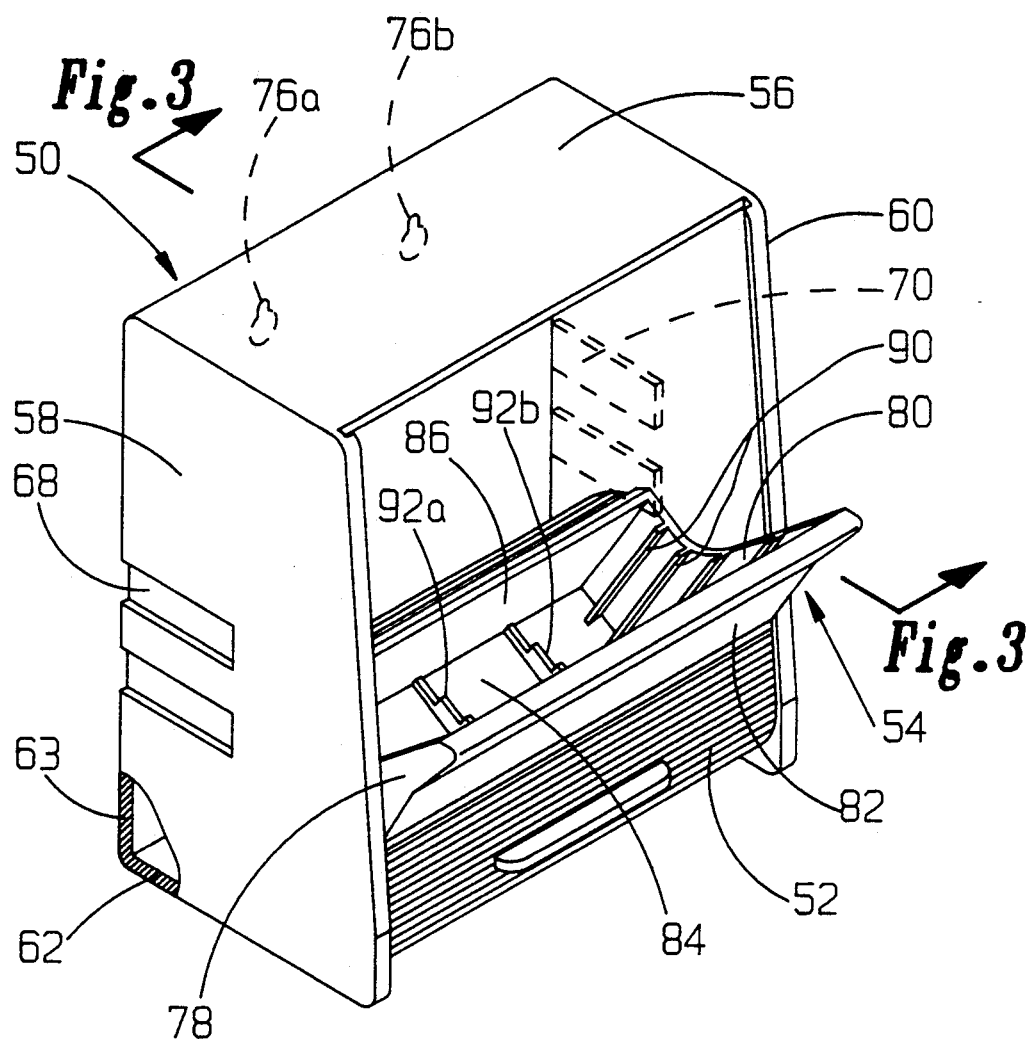
FIG. 2 is a perspective view of a diskette holder of the invention in an open condition.
Figure 2A:
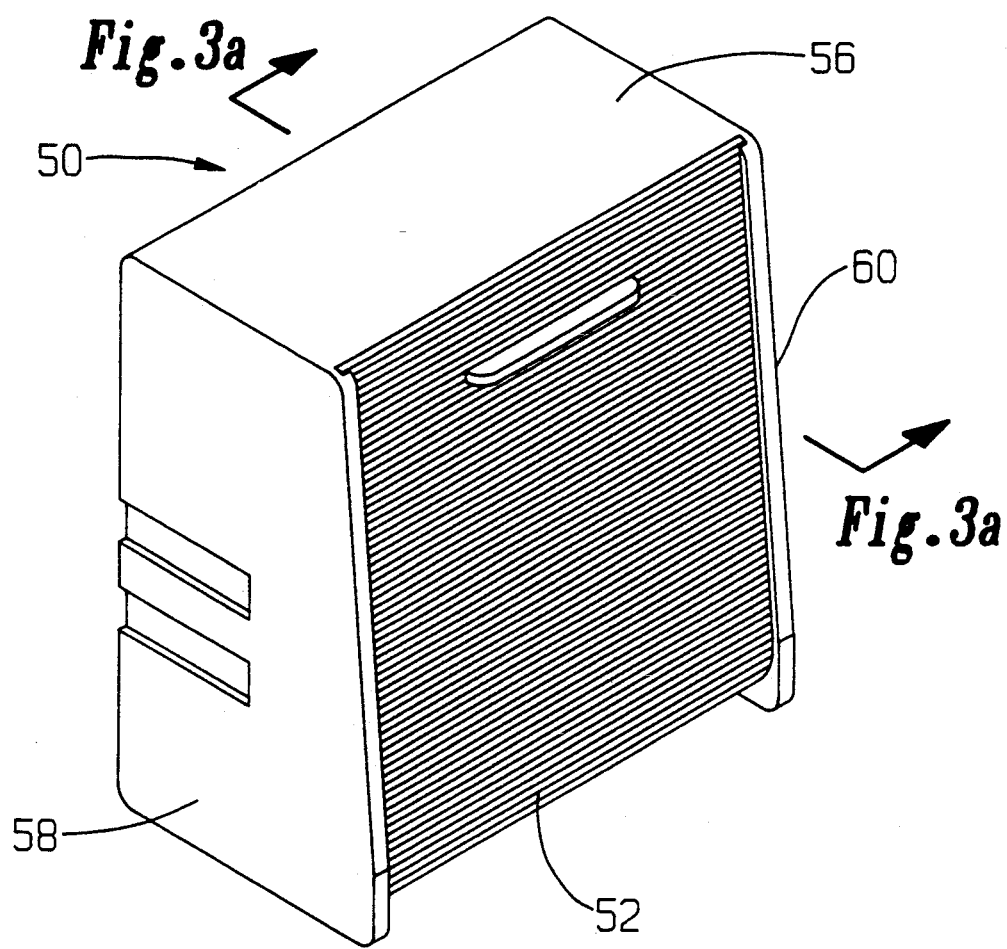
FIG. 2a is a perspective view of the diskette holder of FIG. 2 in a closed condition.

12 - oval sides
14 - integral wall
18 - curved end
20 - front edge
22 - rear edge
24 - opposed grooves
26 - cover
28 - spaced grooves
30 - vertical front end
34 - sector-shaped recesses
36 - flat elongated rectangular bar
38 - supporting plate
38a - vertical block
40 - rectangular supporting frame
50 - housing
52 - tambour
54 - holding case
56 - rectangular top panel
58, 60 - upwardly-tapered side panels
62 - rectangular bottom panel
63 - rectangular back panel
64 - opposed curved grooves
66 - opposed fulcrum pins
68 - female dovetail connector
70 - male dovetail connector
72 - opening stop
74 - closing stop
76a, 76b - keyhole openings 78, 80 - contoured side panels
82 - rectangular front panel
84 - inclined bottom panel
86 - rectangular rear panel
90 - vertical dividing ribs
91 - pivot openings
92a, 92b - stepped strips
94 - closure lip
96 - opening tab
98 - opening end
100 - closing end
102 - inwardly protruding stop
104 - handle
106 - diskettes

SUMMARY

According to the present invention, a diskette holder constitutes a housing with a pivoting holding case and a roll door which acts as a part of an opening-and-closing mechanism.

FIGS 2 AND 3—DESCRIPTION

FIG. 2 shows a perspective view of a diskette holder in an open configuration according to the present invention.

The container comprises a housing 50 which contains a roll door, i.e., a tambour 52, and a holding case 54. Housing 50 includes a rectangular top panel 56, identical upwardly-tapered side panels 58 and 60, a rectangular bottom panel 62, and a rectangular back panel 63.

Side-to-side couplings, such as a female dovetail connector 68 and a male dovetail connector 70, are located on the exterior portions of panels 58 and 60. Wall mounts, e.g., keyhole openings 76a and 76b, are situated in panel 63.

Holding case 54 has contoured identical side panels 78 and 80, a rectangular front panel 82, an inclined bottom panel 84, and a rectangular rear panel 86. Panel 84 comprises stepped strips 92a and 92b which ascend from panel 86 towards panel 82.

Figure 3:
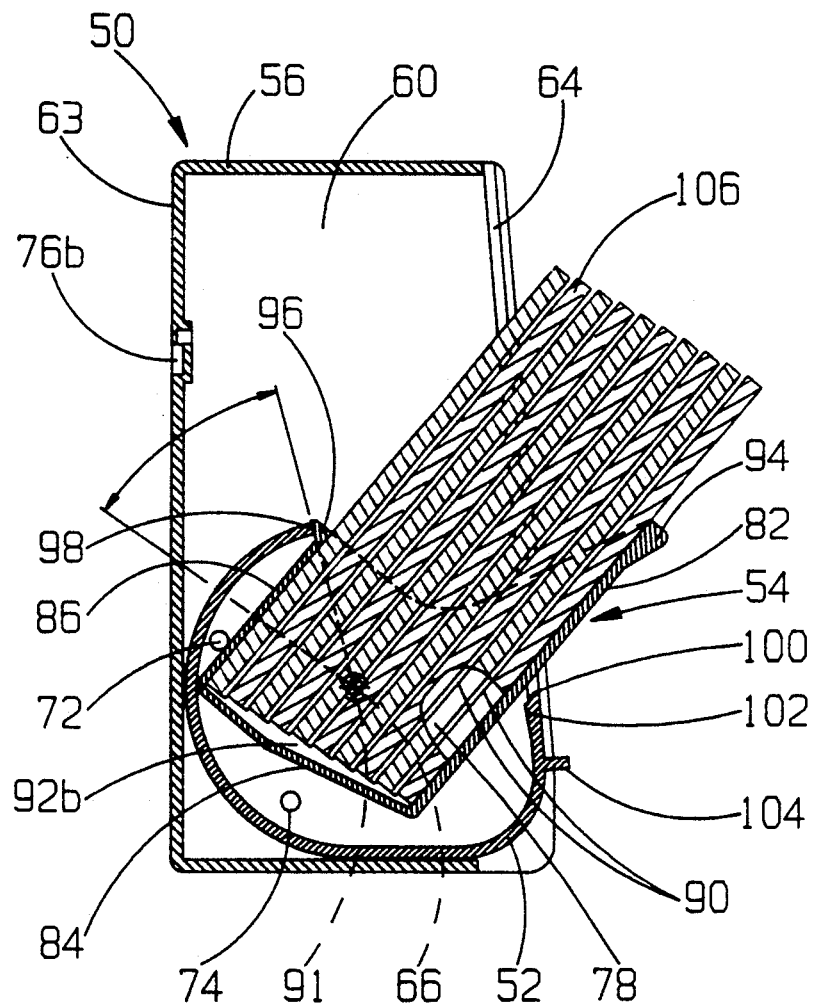
FIG. 3 is a cross-sectional view of the diskette holder of FIG. taken in the direction indicated by lines A—A.

A cross-sectional view of the container of FIG. 2 taken in the direction indicated by lines A—A is shown in FIG. 3.

Panels 58 (not shown) and 60 have two opposed curved grooves 64 and two opposed fulcrum pins 66 on their inside portions. Panel 60 also contains an opening stop 72 and a closing stop 74 at its interior. Panels 78 (not shown) and 80 contain a plurality of opposed vertical dividing ribs 90 on their inner faces. Ribs 90 have a pitch equal to that found between the consecutive steps of strips 92a (not shown) or 92b. Panels 78 and 80 also possess opposed pivot openings 91, which house fulcrum pins 66.

Panel 82 includes a closure lip 94 protruding outwardly along its top edge. An opening tab 96 is situated along the top of panel 86. As case 54 pivots, tab 96 protrudes slightly past grooves 64 at any point along a constant-radius sector bounded by an angle a.

Tambour 52 is slidingly positioned within grooves 64 and comprises alternating thick rigid and thin flexible portions (not shown). This reticulation makes the tambour sufficiently compliant to conform to the contours of grooves 64, yet rigid enough to withstand direct pressure without collapsing inwardly. Tambour 52 has an opening end 98 and a closing end 100. An inwardly-protruding stop 102 is located below the edge of end 100, while a handle 104 is situated below the edge of end 102 on the exterior portion of the tambour. Magnetic diskettes 106 are shown inside case 54.

In one specific embodiment of the invention, housing 50 of the container is approximately 12 cm high, 14.5 cm wide, and 5.5 cm deep. The tambour is about 12 cm long and is made of polyethylene. Case 54 holds approximately ten 3.5-inch diskettes. Both the housing and the case are made of high impact polystyrene.

Figure 3A:
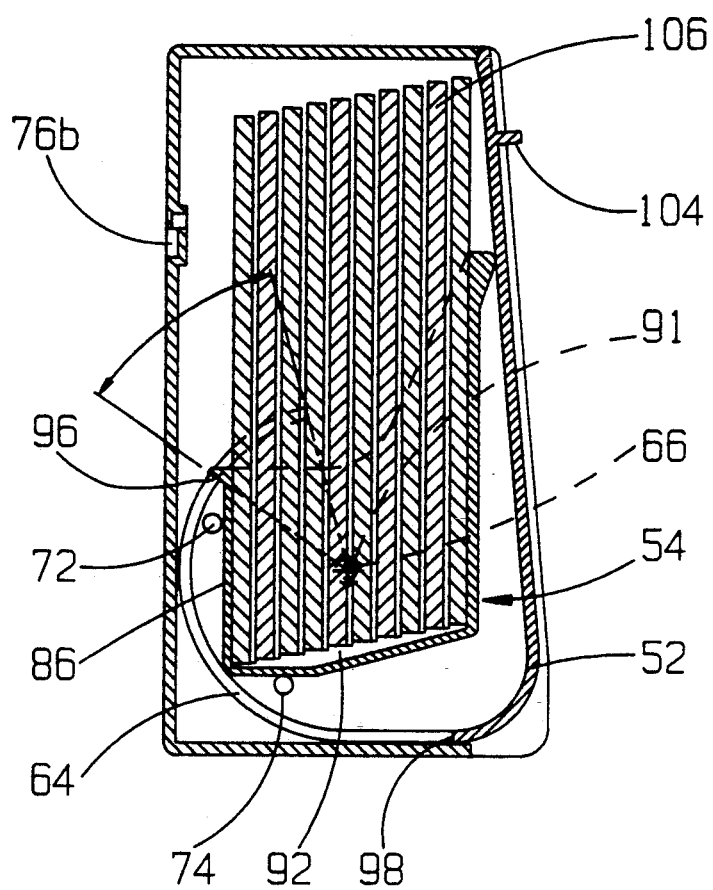
FIG. 3a is a cross-sectional view of the diskette holder of FIG. 2a taken in the direction indicated by lines B—B.

FIGS. 3 and 3a—Operation

To extract diskettes 106 from a closed container, shown in FIG. 3a, handle 104 is pressed downwardly and tambour 52 is slidingly displaced along grooves 64 until its opening end 98 contacts tab 96. The downward displacement of handle 104 presses end 98 against tab 96, thus causing case 54 to pivot clockwise on fulcrum pins 66. As case 54 pivots, diskettes 106 are gradually exposed through the opening formed by the displaced tambour. When the container is being opened, the pivotal motion of case 54 is restricted by stop 72, which contacts panel 86 during its upward motion.

When the container is fully open, as shown in FIG. 3, the diskettes are retained in place by ribs 90. Even if only one diskette is placed inside case 54, it is held securely in its slot and remains substantially parallel to panels 82 and 86. Moreover, stepped strips 92 form a separate level for each diskette, facilitating diskette removal and replacement. The diskette container can be opened with only one hand.

To close the container (FIG. 3), handle 104 is moved upwardly until closing end 100 contacts panel 82. As end 100 pushes against panel 82, case 54 pivots counter-clockwise on pins 66, retracting the diskettes inside housing 50. When end 100 contacts lip 94, case 54 is retracted inside the housing more abruptly to avoid contact between diskettes 106 and tambour 52. Stop 102 arrests the upward displacement of the tambour as it contacts panel 56 of the housing. When the container is fully closed, stop 74 prevents diskettes 106 from contacting the interior of housing 50 by bolstering panel 84 from the bottom.

The container can be closed with only one hand by pushing down on panel 56 with the thumb (not shown) and simultaneously pulling up on handle 104 with the fingers of that hand (also not shown).

The diskette container may also be mounted on a vertical surface utilizing openings 76 (FIG. 2). Moreover, a plurality of containers may be coupled side-to-side with dovetail connectors 68 and 70. If necessary, the container may also be operated when housing 50 is positioned on panels 63, 58, or 60.

SUMMARY, RAMIFICATIONS, AND SCOPE

Thus, it has been shown that I have provided a greatly improved diskette holder which operates in a plurality of orientations, i.e., which may be opened and closed with one hand, which may be mounted on a vertical surface and which occupies little desk space, which may be joined side-to-side with a plurality of identical containers, and which is simple and inexpensive to manufacture.

Although the diskette holder has been shown and described in the form of one specific embodiment, its configuration and materials are given only as examples, and many other modifications of the container are possible. For example, opening stop 72 and closing stop 74 may be located on both sides of the housing rather than only on one side. Dividing ribs 90, which prevent the diskettes from contacting the interior of the housing and possibly jamming inside the container, may form pockets for individual diskettes or for pairs. The diving ribs may also be replaced by pins protruding towards the diskettes from the inner surface of back panel 63.

Moreover, stepped strips 92 may be replaced by an inclined surface, which would also create a separate level for each diskette and would thus facilitate removal and replacement of individual diskettes. Wall mounts 76 can be executed as adhesive strips, hook-and-loop fasteners, or L-shaped members for attachment to a computer monitor. Dovetail side-to-side connectors 68 and 70 may be replaced with any other suitable couplings.

Furthermore, the tambour may be manufactured as a one-piece polypropylene structure or may consist of slats attached to a flexible base. The housing and the case may also be made of polyethylene, polypropylene homopolymer, polypropylene copolymer, clear impact-modified polystyrene, or any other appropriate material. The container can be fabricated in different sizes to accommodate diskettes of various dimensions, e.g., 3.5-inch and 5.25-inch magnetic diskettes, or different quantities of diskettes, e.g., five, ten, fifteen, or twenty.

Therefore, the scope of the invention should be determined, not by the examples given, but by the appended claims and their legal equivalents.

What I claim is:

1. A storage container for magnetic diskettes, said storage container comprising:
   a roll door having a handle, an opening end, and a closing end;
   a housing having a top panel, a bottom panel, a back panel, and two side panels, said side panels containing curved means for slidingly mounting said roll door;
   a holding case pivotally installed inside said housing and having a pivot range, said holding case comprising a front portion, a back portion, a bottom portion, and two side portions, whereby said closing ends pushes against said front portion to close said storage container;
   opening means for pivoting said holding case to an open position, said opening means being located on said back portion, whereby said opening end pushes against said opening means to open said storage container; and
   pins contacting said back portion and said bottom portion of said holding case, said pins being situated on the interior of at least one of said side panels.

2. A storage container for magnetic diskettes, said storage container comrpising:
   a roll door having a handle, an opening end, and a closing end;
   a housing having a top panel, a bottom panel, a back panel, and two side panels, said side panels containing curved means for slidingly mounting said roll door;
   a holding case pivotally installed inside said housing and having a pivot range, said holding case comrpising a front portion, a back portion, a bottom portion, and two side portions, whereby said closing end pushes against said front portion to close said storage container;
   opening means for pivoting said holding case to an open position, said opening means being located on said back portion, whereby said opening end pushes against said opening means to open said storage container; and
   first and second stop means for limiting said pivot range of said holding case, said first and second stop means being situated on the interior of at least one of said side panels;
   and wherein said holding case further includes an outwardly protruding lip situated along the top edge of said front portion of said holding case, retaining means for organizing said magnetic diskettes inside said holding case, and variable-level means from facilitating replacement and removal of said magnetic diskettes in and out of said storage container.

3. A storage container for magnetic diskettes, said storage container comprising:
   a roll door having a handle, an opening end, and a closing end;
   a housing having a top panel, a bottom panel, a back panel, and two side panels, said side panels containing curved means for slidingly mounting said roll door;
   a holding case pivotally installed inside said housing and having a pivot range, said holding case comprising a front portion, a back portion, a bottom portion, and two side portions, whereby said closing end pushes against said front portion to close said storage container;
   opening means for pivoting said holding case to an open position, said opening means being located on said back portion, whereby said opening end pushes against said opening means to open said storage container; and
   first and second stop means for limiting said pivot range of said holding case, said first and second stop means being situated on the interior of at least one of said side panels;
   and wherein said holding case further includes safety means for preventing said magnetic diskettes form contacting said roll door, a plurality of vertical opposed dividing ribs located on the interior of said side portions of said holding case, said vertical opposed dividing ribs having a pitch, and variable-level means for facilitating replacement and removal of said magnetic diskettes in an out of said storage container.

4. A storage container for magnetic diskettes, said storage container comprising:
   a roll door having a handle, an opening end, and a closing end;
   a housing having a top panel, a bottom panel, a back panel, and two side panels, said side panels containing curved means for slidingly mounting said roll door;
   a holding case pivotally installed inside said housing and having a pivot range, said holding case comprising a front portion, a back portion, a bottom portion, and two side portions, whereby said closing end pushes against said front portion to close said storage container;
   opening means for pivoting said holding case to an open position, said opening means being located on said back portion, whereby said opening end pushes against said opening means to open said storage container; and
   first and second stop means for limiting said pivot range of said holding case, said first and second stop means being situated on the interior of at least one of said side panels;

and wherein said holding case further includes safety means for preventing said magnetic diskettes from contacting said roll door, a plurality of vertical opposed dividing ribs located on the interior of said side portions of said holding case, said vertical opposed dividing ribs having a pitch, and a plurality of parallel strips having steps, said strips being located on the interior of said bottom portion of said holding case, said steps having said pitch.

5. A storage container for magnetic diskettes, said storage container comprising:

a housing having a top panel, a bottom panel, a rear panel, and two side panels containing a pair of identical opposed curved grooves having a constant-radius sector;

a tambour including a handle, an opening end, and a closing end, said tambour being slidingly mounted in said curved grooves;

a holding case pivotally installed inside said housing and having a pivot range, said holding case comprising a front portion, a rear portion, a bottom portion, and two side portions, whereby said closing end pushes against said front portion to close said storage container;

a tab, located at the exterior of said rear portion, said tab protruding slightly past said opposed curved grooves at any point along said constant-radius sector, whereby said opening end pushes against said tab to open said storage container;

a pair of pivot stops located on the interior of at least one of said side panels, whereby said pivot stops limit said pivot range of said holding case;

an inwardly protruding portion located at said closing end of said tambour, whereby said inwardly protruding portion arrests the upward motion of said tambour by contacting said top panel of said housing;

safety closing means for preventing said magnetic diskettes from contacting said tambour, said safety closing means being located along the top of said front portion;

retaining means for organizing said magnetic diskettes inside said holding case, said retaining means being situated on the interior of said side portions;

variable-level means for facilitating replacement and removal of said magnetic diskettes in and out of said storage container, said variable-level means being placed on the interior of said bottom portion;

coupling means for side-to-side attachment of a plurality of said storage containers, said coupling means being located on the exterior of said side panels; and attachment means for mounting said storage container on a vertical surface, said attachment means being placed on the exterior of said rear panel.

6. The storage container of claim 5 wherein said safety closing means constitutes an outwardly protruding lip, whereby said closing end of said tambour retracts said holding case inside said housing more abruptly once it contacts said outwardly protruding lip, thus preventing contact between said magnetic diskettes and said tambour.

7. The storage container of claim 5 wherein said retaining means comprises a plurality of vertical opposed dividing ribs, said dividing ribs having a predetermined pitch.

8. The storage container of claim 7 wherein said variable-level means comprises a plurality of parallel strips having steps, said steps having said predetermined pitch.

9. The storage container of claims 5 wherein said coupling means is dove-tail connector having male and female coupling components.

10. The storage container of claim 5 wherein said attachment means is a plurality of key-hole openings.

11. A storage container for magnetic diskettes, said storage container comprising:

a roll door having a handle, an opening end, and a closing end;

a housing having a top panel, a bottom panel, a back panel, and two side panels, said side panels containing at their interior a pair of opposed identical grooves having a constant radius sector;

a holding case pivotally installed inside said housing and having a pivot range, said holding case comprising a front portion, a back portion, a bottom portion, and two side portions, whereby said closing end pushes against said front portion to close said storage container;

a tab protruding slightly past said opposed identical grooves anywhere along said constant-radius sector, said tab being located at the exterior of said back portion, whereby said opening end pushes against said tab to open said storage container; and first and second stop pins situated on the interior of at least one of said side panels, said first stop pin contacting said back portion and said second stop pin contacting said bottom portion of said holding case.

* * * * *